Figure 1:
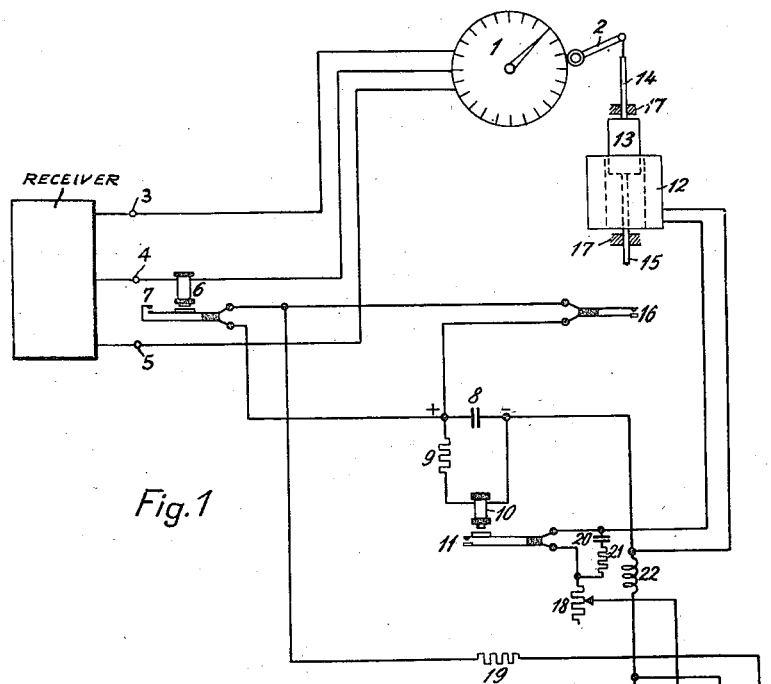

May 13, 1941.  H. EGGERS  2,241,903

DIRECTION FINDING SYSTEM

Filed Aug. 25, 1938

Inventor:
Hans Eggers
by E.D.Phinney
Attorney

UNITED STATES PATENT OFFICE 2,241,903

DIRECTION FINDING SYSTEM

Hans Eggers, Berlin, Germany, assignor to C. Lorenz Aktiengesellschaft, Berlin-Tempelhof, Lorenzweg, Germany, a company Application August 25, 1938, Serial No. 226,616
In Germany March 12, 1937

11 Claims. (Cl. 250—11)

The invention relates to direction finding systems, and more specifically to methods in determining the position of a vehicle by means of a rotary radio beacon.

Methods of determining the position of a vehicle by means of rotary radio beacons are known according to which incident signals of different kind, such as dots and dashes, are counted from a zero reference by a counting mechanism and subtracted from one another. The keying of the rotary radio beacon may produce a longer silent period which, for instance, may persist during a half revolution of the radio beacon when this beacon radiates two rays. Subsequent to the counting of the signals and the ascertainment of the angular position of the counting mechanism during this silent period, the counting mechanisms are restored to normal so as to permit a new counting from the zero reference when the keying is again commenced. It has been suggested to restore the counting mechanisms to the home position either manually, or by means of a signal emitted from the transmitter, or even by the agency of a clockwork.

However, these methods for restoring the counting mechanisms to normal suffer under certain disadvantages. The manually resetting above mentioned requires a concentration of the operator's attention to the counting mechanisms so that the operator is not in a position to perform other manipulations, that is, an automatic operation is not possible. The resetting in response to a signal emitted from the transmitter, on the other hand, requires complicated equipments not only in the receiving, but particularly in the transmitting position which means an enlargement of the entire system. Finally, the method of restoring the counting mechanism or mechanisms to normal by the agency of a clockwork is disadvantageous since the clockwork must operate in exact synchronism with the rotating radio beacon since this expedient cannot be accomplished by means of simple arrangements.

The present invention has for its object to provide a new method of restoring the counting mechanisms into their home positions and this method is characterized in this that the restoring equipment is controlled by the received signal of the rotary radio beacon itself. For instance, the resetting of the counting mechanisms is effected by an electromagnet which is controlled by a relay, said relay being responsive to the received keying signals of the rotary radio beacon.

This new method involves the advantage that the transmitter requires no additional equipment since no particular signals are required for controlling the resetting device from which follows that only the normal keying signals are required. Moreover, complicated devices for maintaining the synchronism are not required in the receiver device since this synchronism is maintained by the keying signals themselves.

The invention will be more readily understood from the following description taken in conjunction with the accompanying drawing, in which—

Figure 2:
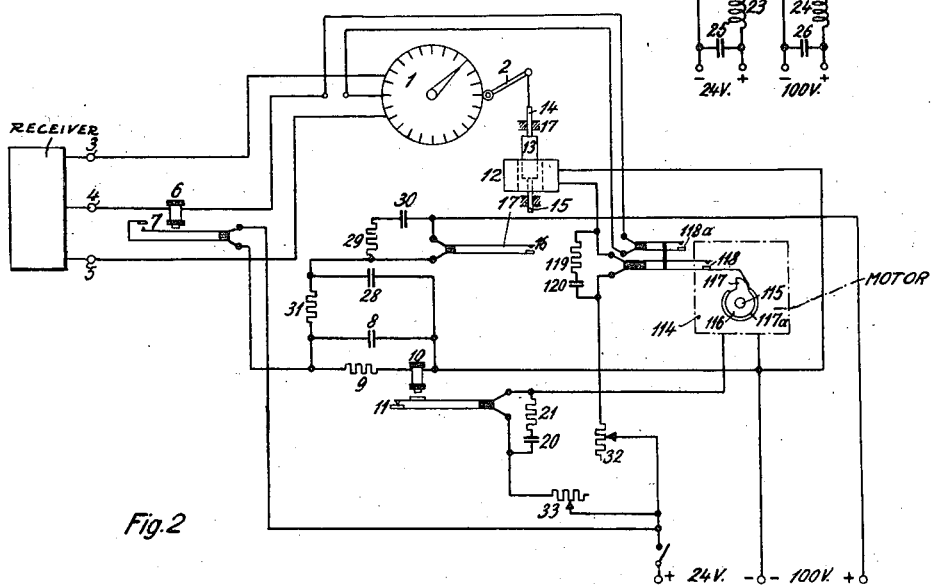

Fig. 1 and Fig. 2 each illustrate one embodiment according to the invention.

The first embodiment according to the Fig. 1 ascertains the time delay for the reading of the counting mechanism as measured from the commencement of the silent period to the zero position and the time delay from the commencement of the resetting operation to the moment when the system is again ready to operate by means of the charge time and discharge time of condenser elements.

According to the second embodiment of the invention represented by Fig. 2 the time delay is ascertained supplementary to the first mentioned embodiment by an additional cam disc device which is maintained rotating by means of an electromotor and which operates a contact with a given time delay. This expedient eliminates the possibility that the time constants are influenced by extraneous impulses.

Referring first to Fig. 1, reference numeral 1 denotes a counting mechanism. A lever 2 effects in its descending motion the resetting of said counting mechanism to normal. The signal voltage of the rotary radio beacon from the output circuit of the receiver is applied to the counting mechanism 1 over the terminals 3, 4 and 5. A relay 6 is interposed in one of the leads between said terminals and said counting mechanism and this relay is controlled by the presence or absence of keying signals. In an operated condition the relay 6 closes its contact 7 and applies thereby a potential of 100 volts for instance from a suitable voltage source across condenser 8 of large capacity. The relay 6 is operated in rhythm with the keying signals whereby the condenser 8 is charged. The condenser slowly discharges over a circuit comprising the resistance 9 and the relay 10. The discharge current maintains the relay 10 operated and its contact 11 open. The condenser 8 is discharged after the elapse of a given delaying period which is determined by the capacity of the condenser 8 and the magnitude of the resistance 9, the discharge current decays, whereupon the relay releases and closes its contact 11 so that a potential source of e. g. 24 volts is applied to the terminals of the electromagnet 12 which is thus energized so as to attract its armature 13. The armature 13 is coupled with the lever 2 of the counting mechanism which performs the resetting of this mechanism to normal position and is moved downwards with the result that said counting mechanism is restored to home position. The armature 13 is equipped with guiding spindles 14 and 15 which glide in the bearings 17.

The release of the resetting magnet 12 is effected as follows. When the armature 13 is entirely drawn down into the magnet coil 12, the spindle 15 abuts against the contact 16 which is then closed. The above mentioned 100 volts potential source is then again connected to the terminals of the condenser 8 which become charged. A discharge current flows through the resistance 9 and the relay 10, and the contact 11 of this relay remains open so that the current path from the 24 volts potential source to the magnet 12 is interrupted whereupon this magnet is de-energized whereupon the armature 13 is brought back to normal position.

The capacitive value of the condenser 8 and the magnitude of the resistance 9 in the first instance determine the time which elapses between the commencement of the silent keying period and the resetting operation, that is, the time which is available for reading off the angular position of the counting mechanism. This time, in turn, depends upon the duration of the silent period since the counting mechanism must have reached normal position before a new keying begins. The resistances 18 and 19 serve for adjusting the charge circuit of the condenser 8 to the most suitable voltage value for energizing the electromagnet 12. The condenser 20 and the resistance 21 have for their object to avoid arcings at the contact 11, and the choke coils 22, 23 and 24 and the condensers 25 and 26 are filter devices which are adapted to reject high frequency interferences.

The operation of the further embodiment shown in Fig. 2 is hereinafter described. This arrangement involves the advantage over the heretofore described arrangement as represented in Fig. 1 that the time delay during the actual observation of the instrument cannot be influenced by extraneous impulses.

The counting mechanism in Fig. 2 is likewise denoted 1, and 2 indicates the resetting lever. The voltage from the receiver is applied to the counting mechanism over the terminals 3, 4 and 5 and the interconnecting leads. A relay 6 having a contact 7 is connected in one of these leads and is controlled by the keying impulses of the rotary radio beacon. A voltage of e. g. 24 volts from a corresponding potential source is periodically applied to the condenser 8 in response to the operation of a contact 7 of relay 6 so that this condenser is charged. This condenser discharges through a resistance 9 and a relay 10 which is energized by the discharge current so as to maintain its contact 11 open. A condenser 20 and a resistance 21 in series with one another are shunted across the contact 11 in order to avoid arcing phenomena at this contact. When the condenser 8 has been discharged, the relay 10 releases and closes its contact 11 with the result that a potential source of e. g. 24 volts is connected to the terminals of a motor 114 on the shaft 115 of which a cam disc 116 is attached. The motor is thereby started and the longer nose 117a at first opens the contact 118a so that the circuit for the counting device is interrupted, whereby the relay 6 is rendered uninfluenceable by extraneous impulses. After a given time of rotation which is decisive for the time available for reading off the counting mechanism, the cam 117 closes the contact 118 which latter is protected against arcings by the resistance 119 and the condenser 120. The heretofore mentioned 24 volts source is applied to the terminals of the resetting magnet 12 by the closed contact 118 and this magnet attracts its armature 13 and operates the resetting lever 2 coupled therewith. The spindles 14 and 15 of the armature 13 are then moved in the bearings 17 in a similar manner as described in connection with Fig. 1. At the end of the armature transit the spindle 15 closes the contact 16 with the result that a potential source of 100 volts is connected to the terminals of a large condenser 28 thus being charged. A resistance 29 and a condenser 30 serve as spark extinguishing means across this contact. The so charged condenser 28 discharges through the resistance 31, the resistance 9 and the relay 10 which is attracted by the discharge current so as to maintain its contact open with the result that the motor 114 is de-energized and stopped. The contact 11 is maintained open by the discharge current until the condenser is entirely discharged. Meanwhile the signal keying period of the radio beacon is again commenced and a new cycle for charging the condenser 8 is again started.

The resistances 32 and 33 serve for regulating the condenser discharge circuit to the most suitable potential value. The leads from the potential source may in a similar manner as described in connection with the first embodiment be equipped with high frequency rejecting means.

The time of the delay between the beginning of the silent period and the resetting depends upon the duration of the keying silent period and is determined by the dimensions of the condenser 8, the magnitude of the resistance 9 and the revolutions of the cam disc 116 per minute. The time which elapses between the moment of finished resetting and arresting and a new ready-to-operate condition of the resetting device is regulated by dimensioning the condenser 28 and the resistance 31.

What is claimed is:

1. A direction finding system comprising a transmitter of the rotary radio beacon type which emits signals of different kind, such as dots and dashes, alternately in accordance with a given rhythm, transmission of signals being periodically interrupted by longer silent periods, comprising a receiver adapted to pick-up said signals, said receiver having a counting mechanism in which said signals of different kind are counted with respect to a zero reference and subtracted from each other connected to said receiver, a resetting system comprising, a timing device associated with said counting mechanism, means responsive to the normal received signal for preparing said timing device for operation, means coupled with said timing device to operate upon the decay of said normal signal transmission upon cessation of received signals during said silent periods of said transmitter, and means controlled by said coupled means responsive to said operation upon decay of normal signals to restore said counting mechanism to normal position shortly in advance of the conclusion of the silent period of said transmitter before the succeeding keying period of said transmitter commences.

2. A direction finding system according to claim 1, wherein said last named means comprises an electromagnet, and said means coupled with said timing device comprises a relay responsive to the normal signals received from said transmitter.

3. A direction finding system according to claim 1, wherein said last mentioned means comprises an electromagnet, and said means coupled to said timing device comprises a relay responsive to the normal signals received from said transmitter, further comprising means for de-energizing said electromagnet to reset its armature to normal after having restored said counting mechanism to home position.

4. A direction finding system as set forth in claim 1, wherein said timing device comprises a circuit including a condenser for determining the time which elapses between the beginning of the silent period of said transmitter and the instant when the resetting of said counting mechanism is initiated, which time interval coincides with the time interval available for reading the indication of said counting device, and for determining the time which elapses between the initiation of the resetting proceeding of said counting mechanism and the instant when the combined timing device-counting mechanism is again ready to operate.

5. A direction finding system as set forth in claim 1, wherein said timing device comprises a circuit including a condenser for determining the time which elapses between the beginning of the silent period of said transmitter and the instant when the resetting proceeding of said counting mechanism is initiated, which time interval coincides with the time interval available for reading the indication of said counting device, and for determining the time which elapses between the initiation of the resetting of said counting mechanism and the instant when the combined timing device-counting mechanism is again ready to operate, and said means for restoring said counting mechanism comprises an electromagnet further comprising a motor driven rotating cam disc device for delaying the operation of said electromagnet to determine the time which elapses between the beginning of the silent period of said transmitter and the instant when the resetting proceeding of said counting mechanism is initiated.

6. A direction finding system as set forth in claim 1, wherein said means responsive to said normal received signals comprises a relay arranged between said receiver and said counting mechanism, whereby said relay operates in rhythm with the signals picked-up by said receiver, said timing device comprising a condenser, said means for preparing said timing device for operation comprising, means controlled by said relay for charging said condenser, the charging and discharge periods of said condenser timing the operation of said counting mechanism.

7. A direction finding system as set forth in claim 1, wherein said means responsive to said normal received signals comprises a relay arranged between said receiver and said counting mechanism, whereby said relay operates in rhythm with the signals picked-up by said receiver, said timing device comprising a condenser and a resistance in series, means for charging said condenser in response to operation of said relay, a discharge circuit for said condenser comprising said resistance and a second relay connected in series across said condenser, said second relay being held attracted during the discharge period of said condenser, said means for restoring said counting mechanism to normal being an electromagnet, and a contact closed after de-energization of said second relay by discharge of said condenser for applying a potential to said electromagnet to restore said counting mechanism to normal position.

8. A direction finding system as set forth in claim 1, wherein said means for resetting said counting mechanism comprises an electromagnet having an energizing current path and an armature, further comprising contacts closed by said armature upon resetting of said counting mechanism to normal position, means responsive to closing said contacts to apply a potential across a condenser for charging said condenser, means for applying the discharge current of said condenser to a relay, and means responsive to operation of said relay to interrupt the current path for said electromagnet.

9. A direction finding system as set forth in claim 1, wherein said means for resetting said counting mechanism comprises an electromagnet having an energizing circuit and an armature, further comprising contacts closed by said armature upon resetting of said counting mechanism to normal position, a condenser, means responsive to closing said contacts to apply a potential across said condenser for charging said condenser, a relay, means for applying the discharge current of said condenser to said relay, an electromotor carrying a cam disc on its shaft included in an energizing circuit, means responsive to operation of said relay to hold open a contact in the energizing circuit of said electromotor and means responsive to movement of said cam disc to actuate further contact in an energizing circuit for said electromagnet.

10. A direction finding system as set forth in claim 1, wherein said timing device comprises a timing circuit including a condenser and means for periodically charging said condenser, the charging and discharge period of condensers determining the timing of said timing device, the length of said timing period depending on the dimensioning of said condensers.

11. A direction finding system as set forth in claim 1, further comprising spark extinguishing means between a potential source for energizing said timing device and said counting device.

HANS EGGERS.